United States Patent
Schwan

(10) Patent No.: US 10,452,628 B2
(45) Date of Patent: Oct. 22, 2019

(54) DATA ANALYSIS SCHEMA AND METHOD OF USE IN PARALLEL PROCESSING OF CHECK METHODS

(71) Applicant: SAP SE, Walldorf (DE)

(72) Inventor: Jörg Schwan, Heidelberg (DE)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 15/349,401

(22) Filed: Nov. 11, 2016

(65) Prior Publication Data
US 2018/0137161 A1 May 17, 2018

(51) Int. Cl.
*G06F 16/215* (2019.01)

(52) U.S. Cl.
CPC .................... *G06F 16/215* (2019.01)

(58) Field of Classification Search
CPC ......... G06F 17/30371; G06F 17/30294; G06F 16/215
See application file for complete search history.

(56) References Cited

U.S. PATENT DOCUMENTS

| | | | | |
|---|---|---|---|---|
| 5,819,249 A * | 10/1998 | Dohanich | ............... | G06N 5/022 706/46 |
| 6,604,110 B1 * | 8/2003 | Savage | ............. | G06F 17/30563 707/602 |
| 8,417,715 B1 * | 4/2013 | Bruckhaus | ............. | G06Q 10/04 707/758 |
| 9,105,000 B1 * | 8/2015 | White | .............. | G06Q 10/06398 |
| 9,348,850 B1 * | 5/2016 | Fei | ......... | G06F 16/211 |
| 2005/0022156 A1 | 1/2005 | Schwan et al. | | |
| 2007/0079267 A1 * | 4/2007 | Hong | .................... | G06F 17/504 716/103 |
| 2009/0193039 A1 * | 7/2009 | Bradley | ............ | G06F 17/30539 |
| 2009/0240694 A1 * | 9/2009 | Jensen | .................... | G06F 17/30 |
| 2014/0016501 A1 * | 1/2014 | Kamath | .................. | H04L 69/22 370/253 |

OTHER PUBLICATIONS https://docs.oracle.com/cd/E11882_01/server.112/e25554.pdf by Oracle Jul. 2013 (Year: 2013).*
"ECATT (Extended Computer Aided Test Tool)," retrieved from http://go.sap.com/documents/2015/07/eac23283-527c-0010-82c7-eda71af511fa.html, on or before Nov. 7, 2016, 76 pages.
"ABAP Unit Tests," retrieved from http://help.sap.com/saphelp_nw70/helpdata/EN/14/a794422760c46ae10000000a155106/frameset.htm, on or before Nov. 7, 2016, 3 pages.
"ABAP Unit Best Practices," retrieved from https://wiki.scn.sap.com/wiki/display/ABAP/ABAP+Unit+Best+Practices, on or before Nov. 7, 2016, 3 pages.
"Creating Basic Reports with the SAP Query Tool," retrieved from http://ptgmedia.pearsoncmg.com/images/9780672329029/samplechapter/0672329026_CH03, on or before on or before Nov. 7, 2016 18 pages.

(Continued)

*Primary Examiner* — Arpan P. Savla
*Assistant Examiner* — Maher N Algibhah
(74) *Attorney, Agent, or Firm* — Klarquist Sparkman, LLP

(57) ABSTRACT

An identifier of a data source specifying data to be analyzed is determined from a data analysis schema. The data source is called, and data to be analyzed is retrieved. From the data analysis schema, an identifier of a check method to be used to analyze the data is determined. The check method is called and used to analyze the data.

20 Claims, 12 Drawing Sheets

(56) References Cited

OTHER PUBLICATIONS

"Z-Reports," retrieved from https://archive.sap.com/discussions/thread/446460, on or before Nov. 7, 2016, 11 pages.
"All Z report," retrieved from https://archive.sap.com/discussions/thread/765483, on or before Nov. 7, 2016, 12 pages.
"Framework for Parallel Processing," retrieved from http://help.sap.com/saphelp_erp60_sp/helpdata/en/42/c1fbde262c311ae10000000a1553f7/content.htm, on or before Nov. 7, 2016, 2 pages.
"Functioning and Architecture of Framework for Parallel Processing," retrieved from http://help.sap.com/saphelp_erp60_sp/helpdata/en/56/7dcb53f0f67314e10000000a174cb4/frameset.htm, on or before Nov. 7, 2016, 2 pages.
"Quality Checking with the ABAP Test Cockpit," retrieved from http://help.sap.com/saphelp_nw70ehp2/helpdata/en/62/c41ad841554516bb06fb3620540e47/content.htm?frameset=/en/ea/1fcbaaba3c411190cc9a34ae31dfa4/frameset.htm&current_toc=/en/64/d255cb986147f3a7bad0a000d88174/plain.htm&node_id=491&show_children=false, on or before Nov. 11, 2016 1 page.
Kaestner, Christopher, "ABAP Test Cockpit—an Introduction to SAP' s new ABAP Quality Assurance Tool," retrieved from https://blogs.sap.com/2012/09/19/abap-test-cockpit-an-introduction-to-sap-s-new-abap-quality-assurance-tool/, 2012, 21 pages.
"ABAP Test Cockpit," retrieved from https://wiki.scn.sap.com/wiki/display/ABAP/ABAP+Test+Cockpit, on or before Nov. 11, 2016, 2 pages.

\* cited by examiner

DATA ANALYSIS SCHEMA AND METHOD OF USE IN PARALLEL PROCESSING OF CHECK METHODS

FIELD

The present disclosure generally relates to data analysis, such as analyzing data for consistency. Particular implementations relate to a schema that can be used to define a data analyses procedure.

BACKGROUND

The storing and manipulation of large amounts of data is becoming ever more important. It can be important for data to be consistent within a particular data storage system, or between different data storage systems. As data is manipulated, there is the chance to produce data, or modify source data, that contains inconsistencies. In some cases, data inconsistencies can refer to differences between what should be the same or a related data item stored in two or more locations. In other cases, data inconsistencies can refer to data that does not adhere to one or more rules relating to the data, such as formatting of the data or relationships with other data items.

Data inconsistencies can be difficult to detect, and can have negative impacts on users and companies. Typically, data inconsistencies are not discovered until a user reports a problem or an error. In some cases, the provider of a database system or other data management program, or in house support personnel, are contacted to determine the source of the problem and to determine the severity of the issue because it may not be known how many users or data items may be subject to the problem. To try and isolate the source of the problem, a software developer or other individual with appropriate technical expertise can write a report, such as a program or script, to apply check methods to determine whether data is consistent, and the source of any inconsistency. However, these reports are typically created for very specific circumstances, are very labor intensive, and are often not used after initial investigation, and potentially solution, of the problem. Thus, there remains room for improvement in the analysis of data, including analysis for consistency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating data analysis using a data analysis schema. According to a particular method, an identifier of a data source specifying data to be analyzed is determined from the data analysis schema. The data source is called, and data to be analyzed is retrieved. From the data analysis schema, an identifier of a check method to be used to analyze the data is determined. The check method is called and used to analyze the data.

According to another method, user input is received selecting at least one data source from a library of data sources for inclusion in a data analysis schema. The selected data source, such an identifier of the data source, is stored in the data analysis schema. User input is received selecting at least one check method from a library of check methods to be included in the data analysis schema. In some implementations, a plurality of check methods are selected. The check method is stored in the data analysis schema. In particular examples, the method can include executing the data analysis schema. For example, data can be retrieved from the stored data source. The stored check method can be applied to the retrieved data.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

The storing and manipulation of large amounts of data is becoming ever more important. It can be important for data to be consistent within a particular data storage system, or between different data storage systems. As data is manipulated, there is the chance to produce data, or modify source data, in a way that creates data inconsistencies. In some cases, data inconsistencies can refer to differences between what should be the same or related data item stored in two or more locations. In other cases, data inconsistencies can refer to data that does not adhere to one or more rules relating to the data, such as formatting of the data or relationships with other data items.

Data inconsistencies can be difficult to detect, and can have negative impacts on users or companies. Typically, data inconsistencies are not discovered until a user reports a problem or an error. In some cases, the provider of a database system or other data management program, or in house support personnel, are contacted to determine the source of the problem and its severity, as it may not be known how many users or data items may be affected by the problem. To try and isolate the source of the problem, a software developer, or other individual with appropriate technical expertise, can write a report, such as a program or script, to apply check methods to determine whether data is consistent, and potentially identify the source of any inconsistency.

However, while more general-purpose tools may be available to test the operation of a data procedure, or the operation of code associated with a database or other data management system, these reports are typically created for very specific circumstances, are very labor intensive, and are often not used after initial investigation, and potentially solution, of the problem. Thus, there remains room for improvement in the analysis of data, including analysis for consistency.

Figure 1:
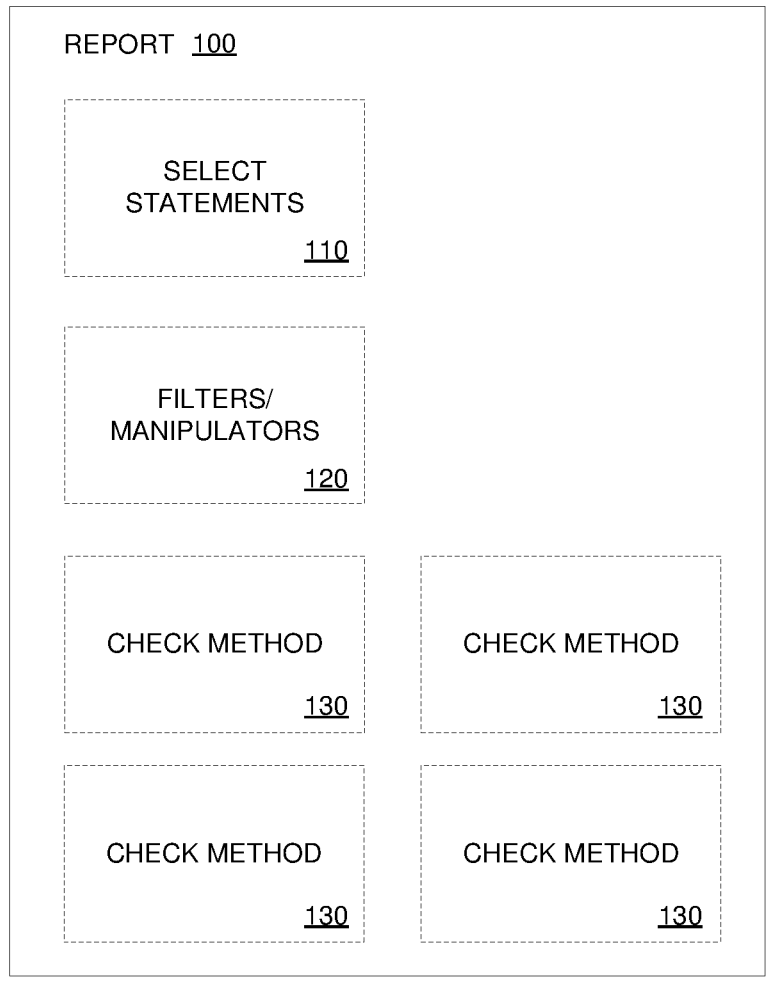
FIG. 1 is a diagram schematically depicting a prior art report.

FIG. 1 illustrates an example of a prior art report 100 that can be used to check data consistency. The report 100 is typically written as a monolithic program or script that includes commands, such as SQL select statements 110, to retrieve particular data. In some cases, the data retrieved by the select statements 110 can be subject to further manipulation or filtering 120 before being analyzed by one or more check methods 130.

Because of its monolithic structure, and creation for a particular scenario, reports are typically only useful for a very specific situation or problem. Even for the same purpose or problem, reports may become outdated, such as being unusable or unreliable, when the software implementing the data management system is changed. Although the reports are often created to solve a problem identified by an end user, the reports themselves are typically not provided to the end user, in part because of the technical complexity of the reports. Even within a software provider, a report may only be known to the particular developer who created it. Thus, the report may easily be forgotten, or known only to one person, or a limited number of people.

The present disclosure provides for improved data analysis, including analyzing data for consistency. A data analysis schema can be broken into data sources, check methods, and, optionally, data evaluators. Data sources, check methods, and data evaluators can be stored as individual components that can be combined, including with newly created data sources, check methods, and data evaluators, and modified, as desired by a user. Thus, by making components of a data analysis schema modular, a user can be provided with a library of elements from which a schema may be constructed. The ability to reuse prior programming can greatly reduce the time needed to develop new data analysis procedures, and can make data analysis accessible to users with less technical expertise.

The ease of creating and running analyses can facilitate routinely running check methods (including in a scheduled or automated way), which can more quickly identify potential errors. When check methods are run more frequently, the impact of errors can be limited, and confidence in data increased.

In addition, the present disclosure can provide advantages over other techniques for analyzing code or data for integrity, such as tests which analyze the code used to produce data. While checking the code, such as against a test data set, may identify some errors, an actual data set may be more diverse and latent errors may be introduced. Similarly, the interaction of multiple code segments may produce errors that cannot be determined by analyzing the code segments in isolation. By analyzing the results of code execution (the produced data), errors can be identified, and the source of the errors in the code investigated.

As will be further described, components of the data analysis schema can interact in a way that can encourage component creation in a manner that facilitates reuse. For example, data to be obtained from a data source, such as by a data provider, can be determined, at least in part, from the particular check method or methods selected for the schema. That is, the check methods can specify data to be retrieved from the data sources by the data provider for use in the check methods. Thus, rather than defining a data source very narrowly (to avoid retrieving unnecessary data, speed processing time, and reduce system resources), a data source can be defined more broadly, with the check methods serving to specify, and thus limit, the data retrieved to that needed for the check methods themselves.

A user wishing to run new check methods on data sources may be able to simply reuse an existing data source with a newly written or modified check method, rather than having to define the data source. Similarly, check methods can be written that can be applied to different data sources, so long as the data is in the form used for the check method. Thus, a user wishing to analyze data, such as for consistency, may be able to simply associate the previously created check method with their particular data source. Or, the modularity of the check method may facilitate it being modified by the user to accommodate their particular data source. Data evaluators may also be created and reused in a manner similar to data sources and check methods.

The present disclosure can also increase confidence in data, such as if no errors are identified by the check methods. Also, if the check methods are routinely run, a user can have confidence that any errors will be called to their attention. In some cases, this trust in data may encourage users to share data, to modify shared data, or allow shared data to be modified, as they will not be as concerned with sharing, using, or modifying potentially erroneous data. Thus trust may encourage new working and collaboration models.

Figure 2:
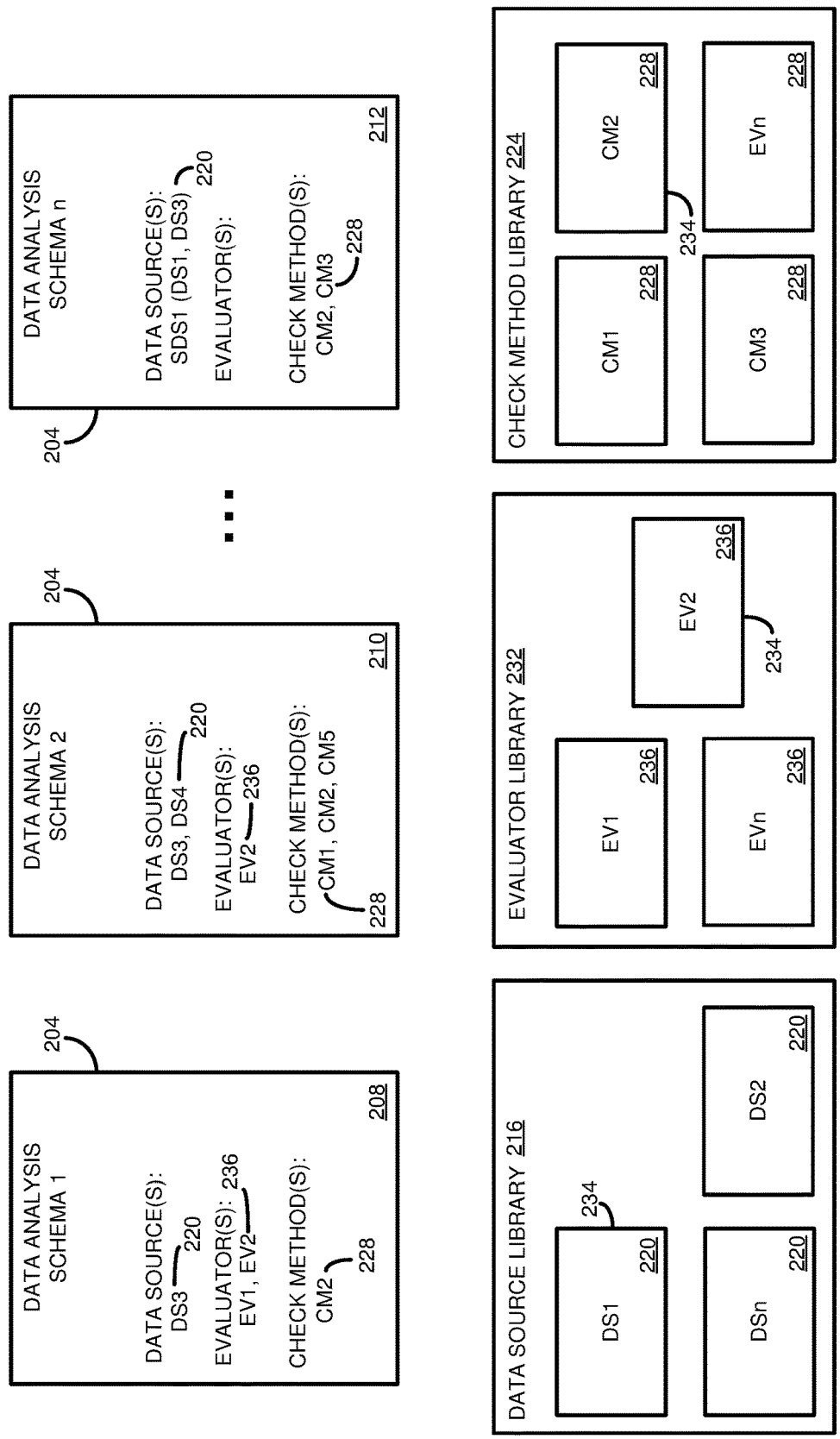
FIG. 2 is a diagram schematically depicting how a data analysis schema can be formed by selecting from appropriate libraries one or more data sources, one or more check methods, and, optionally, one or more data evaluators.

FIG. 2 illustrates the concept of creating a data analysis schema 204, such as schema 208, 210, 212, from a library 216 of data sources 220, a library 224 of check methods 228, and, optionally, a library 232 of data evaluators 236. The data sources 220, data evaluators 236, and check methods 228 can be referred to as schema components 234. Data analysis schema 208 includes a single data source 220, DS3, two data evaluators 236, EV1 and EV2, and a single check method 228, CM2. In some cases, some or all of the schema components 234 used in a data analysis schema 204 can be referenced or called by the data analysis schema. For example, the schema components 234 may be represented as abstract data types, such as a class. A schema 204 may create instances of the abstract data types of the schema components 234. In other cases, code or other definition (or specification) of the schema components 234 can be copied into the data analysis schema 204. According to a particular aspect, a single data source 220 and, optionally a single evaluator 236 are used, and a data analysis schema 204 can include one or more, typically a plurality, of check methods 228.

In creating a data analysis schema 204, a user need not be limited to using schema components 234 in one of the libraries 216, 224, 232. A user may choose to define new schema components 234. For example, schema 210 includes a data source 220, DS4, that is not initially present in the library 216, and a check method 228, CM5, that is not initially present in the library 224. Schema 210 also includes schema components 234 that are present in the libraries 216, 224, 232, such as a data source 220, DS3, a data evaluator 236, EV2, and two check methods 228, CM1 and CM2. In other cases, a data analysis schema 204 can be defined entirely using schema components 234 not initially present in one of the libraries 216, 224, 232. In particular aspects, schema components 234 not initially present in one of the libraries 216, 224, 232, such as schema components imported from another system or newly created by a user, may be saved in the appropriate library. For example, a user may choose to add one or more of such schema components 234 to the appropriate library 216, 224, 232, or the schema components can automatically be added to the appropriate library. In some aspects, schema components are executed with reference to a corresponding library. Thus, newly created or imported schema components may be added to the appropriate library prior to, or during, schema creation (e.g., prior to schema execution).

As will be further described, in some cases data sources 220 can represent primary data sources. A primary data source can be a unique source of data. If multiple data sources 220 are needed, in some implementations, they can be independently included in a data analysis schema. In other implementations, multiple primary data sources 220 can be combined to provide a secondary data source. Schema 212 includes a single data source 220, SDS1, a secondary data source formed from two primary data sources, DS1 and DS3. In at least some cases, defined secondary data sources can also be stored in the library 216. A particular data analysis schema 204 can use the same or differing types of data sources 220, such as one or more primary data sources, one or more secondary data sources, or a combination of one or more primary data sources and one or more secondary data sources.

As discussed above, the use of data evaluators 236 can be optional. Data analysis schema 212 does not include a data evaluator 236. Data analysis schema 212 includes two check methods 228, CM2 and CM3.

Figure 3:
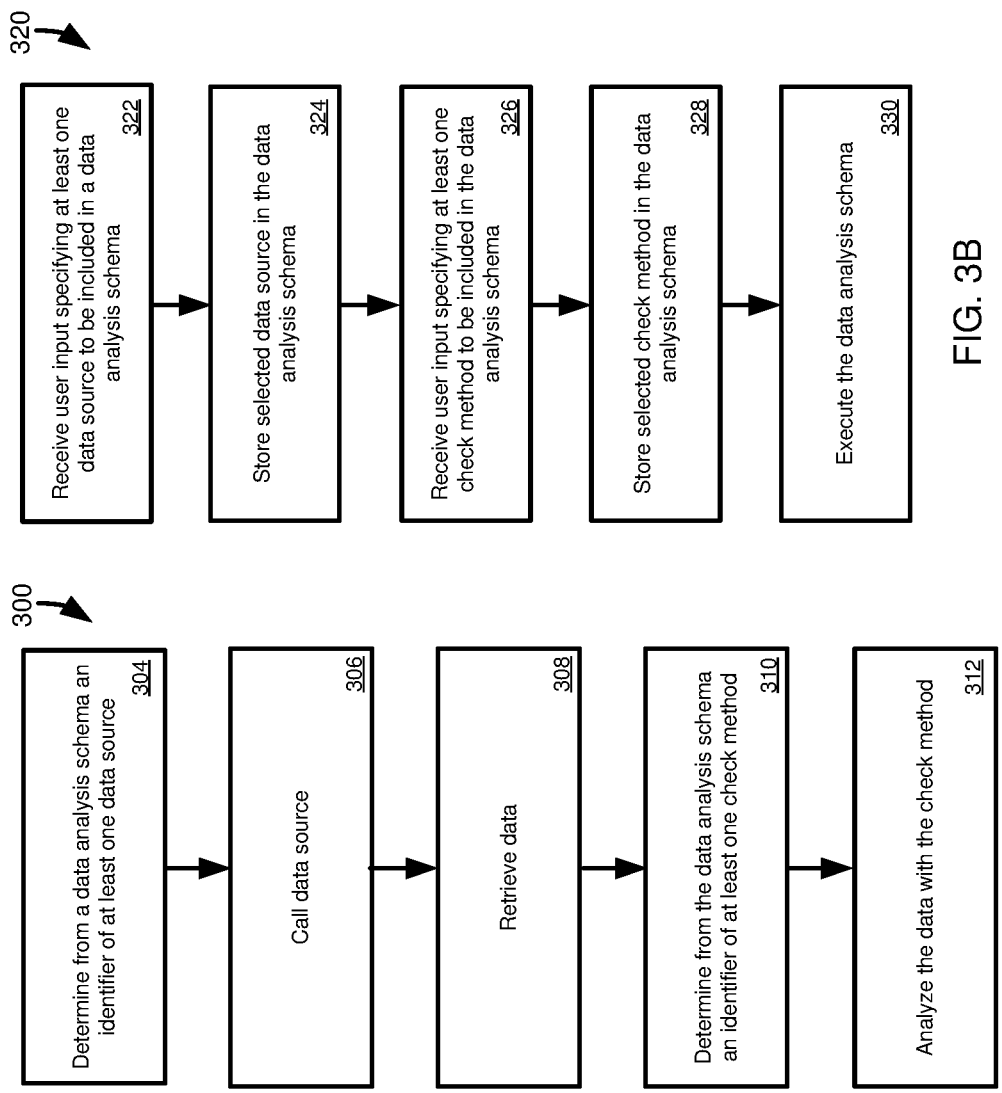
FIG. 3A is flowchart of a method for executing a data analysis schema according to an embodiment of the present disclosure.
FIG. 3B is flowchart of a method for defining and executing a data analysis schema according to an embodiment of the present disclosure.

FIG. 3A illustrates a method 300 for executing a data analysis schema according to an embodiment of the present disclosure. At 304, an identifier of at least one data source is determined from the data analysis schema. The data source is called at 306. At 308, the data is retrieved, such as from a database or other data repository. An identifier of at least one check method is determined from the data analysis schema at 310. The data is analyzed with the check method at 312.

FIG. 3B illustrates a method 320 for creating and executing a data analysis schema according to an embodiment of the present disclosure. At 322, user input is received specifying at least one data source to be included in a data analysis schema. The selected data source (such as a reference to, or identifier of, the data source) is stored in the data analysis schema at 324. At 326, user input is received specifying at least one check method to be included in the data analysis schema. The selected check method (such as a reference to, or identifier of, the check method) is stored in the data analysis schema at 328. The data analysis schema is executed at 330.

Example 2—Example Check Methods

In particular examples, a check method can determine whether data follows a set of rules governing the data. As an example, consider a process that records integer identifiers A and C, and character identifier B. There is a rule that states that if identifier A is equal to 145, only entries that have identifier A as 145 or the tuple (A, B) of (110, R) are permitted to follow. A check method can be implemented that analyzes data to determine if a dataset obeys the rule.

A dataset as set forth in the table below is analyzed:

| A | B | C |
|---|---|---|
| 110 | N | 2 |
| 110 | A | 4 |
| 145 | A | 5 |
| 110 | A | 7 |

The check method would identify this dataset as not obeying the specified rule, because the final entry follows an entry with A equal to 145, but the final entry does not have A equal to 145 or the tuple (110, R) (having instead the tuple (110, A)). However the following dataset would be found to obey the rule, because the entry following the entry with A equal to 145 has the tuple (110, R).

| A | B | C |
|---|---|---|
| 110 | N | 2 |
| 110 | A | 4 |
| 145 | A | 5 |
| 110 | R | 7 |
| 110 | A | 8 |

The present disclosure is not limited to any particular check method. Generally, a check method may be used to determine whether data has or does not have a particular value (or values), including whether data has a value higher, lower, or equal to some threshold or other determined (including predetermined) value. As demonstrated in the example above, values of multiple data items can be used to define a data consistency rule, or check method. In further cases, a check method can determine whether two different versions of a dataset (such as a local version of data and a remote version of data) are consistent.

Example 3—Example Software Architecture

Figure 4:
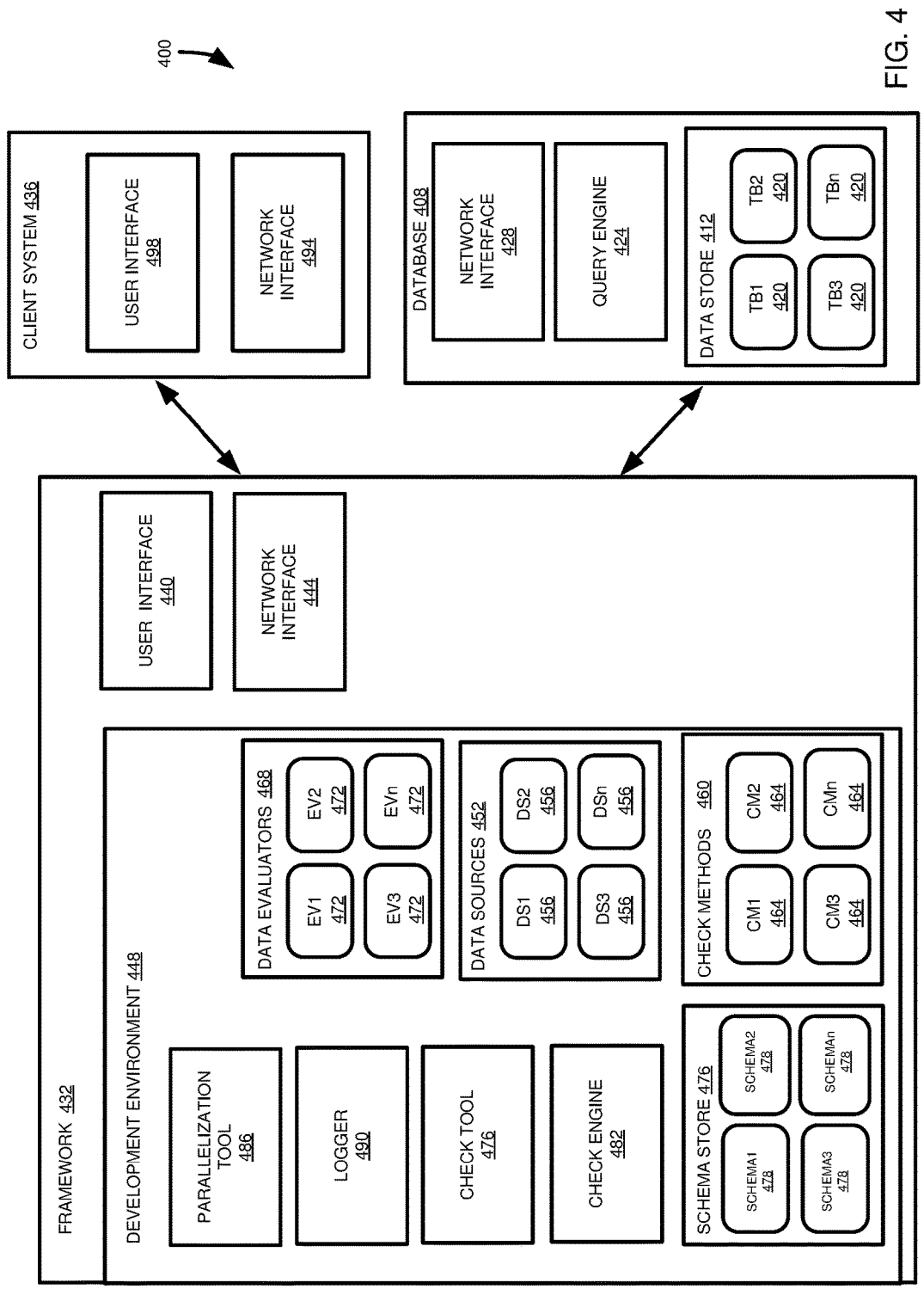
FIG. 4 is a block diagram illustrating an example software architecture in which a database, a framework, and a client system can interact in order to execute a data analysis schema according to an embodiment of the present disclosure.

FIG. 4 is a block diagram providing an example software architecture 400 that can be used in implementing at least certain embodiments of the present disclosure. The architecture 400 can include a database 408 or other data repository or data store. In some cases, the database 408 can be the HANA database system of SAP SE of Walldorf, Germany.

The database 408 can include a data store 412. The data store 412 can include all or a portion of data specified by one or more data sources 456. In particular examples, the data store 412 can include data stored in tables 420. In some cases, data can be specified, and retrieved, from the data store 412 using queries, such as structured query language (SQL) statements. In other cases, particular data items in the tables 420, or other data items, can be directly specified by a data source 456, such as by retrieving selected database records, or fields thereof, using the record identifiers, or another key value, associated with the desired data. Database queries can be processed using a query engine 424.

The database 408 can include additional components. For example, the database 408 can include a network interface 428, which can allow the database to communicate with other components of the architecture 400. The database 408 may include more or fewer features than shown.

A framework 432 can serve as the interface between a client system 436, which may be used by an end user, and the database 408. The framework 432 can facilitate a user in accessing, generating, and executing data analysis schema, such as through a user interface 440. The framework 432 can include a network interface 444, which the framework 432 can use to communicate with other components of the architecture 400, such as the client system 436 and the database 408. In particular examples, the framework 432 can be, or be part of, the NETWEAVER technology platform of SAP SE of Walldorf, Germany.

The framework 432 can provide a development environment 448. The development environment 448 can include a data source store 452, which can correspond to the data source library 216 of FIG. 2, including one or more data sources 456. A check method store 460, storing check methods 464, can be included in the development environment 448, and can correspond to the check method library 224 of FIG. 2. The development environment 448 can further include a data evaluator store 468, which can include one or more data evaluators 472, and can correspond to the data evaluator library 232 of FIG. 2.

The development environment 448 can include a check tool 476. The check tool 476 can allow a user to create, select, and modify data analysis schema, as well as to request that a particular data analysis schema be executed. Data analysis schema 480 can be stored in a schema store 478. The check tool 476 can execute a data analysis schema using a check engine 482. For example, the check engine 482 can request data from the data sources 456 (including communicating with the check method store 460 to determine information needed by check methods 464 associated with the data analysis schema), and apply any check methods 464 or data evaluators 472 (such as by communicating with the data evaluator store 468) associated with the data analysis schema.

The development environment 448 can include additional components that can facilitate the creation or execution of a data analysis schema. For example, the development environment 448 can include a parallelization tool 486. The parallelization tool 486 can break the operations associated with the execution of a data analysis schema into multiple jobs that can be executed in parallel, which can speed up execution of a data analysis schema 480. In at least some cases, the data analysis schema 480, such as in the definition of the data sources 456, check methods 464, or data evaluators 472, can be used to direct the application of the parallelization tool 486. In particular examples, the parallelization tool 486 can be the FRAMEWORK FOR PARALLEL PROCESSING of SAP SE of Walldorf, Germany.

The ability to execute operations of data analysis schema in parallel is another advantage of the data analysis schema of the present disclosure. In at least some cases, a data analysis, such as a report, can only take advantage of parallel execution, even with a component such as the parallelization tool 486, if the data analysis were specifically written (e.g., coded) to take advantage of parallel processing. However, coding for parallelization can be both time consuming, and require particular technical expertise. Thus, in many cases a data analysis may not take advantage of the benefits offered by parallelization. By separating a data analysis into the components of a data analysis schema, a schema component, such as a data source 456, can be written once to take advantage of parallelization, and then used in many different data analysis schema. As data to be retrieved can, in at least in some cases, be specified by the check methods 464 of the data analysis schema, a data source 456 may be defined more broadly, increasing its ability to be reused, including any parallel processing that may have been included in the data source.

The development environment 448 can also include a logging component 490. The logging component 490 can be used to obtain information regarding the execution of a data analysis schema, including any errors that may have been encountered during application of a check method 464. In at least some cases, the logging component 490 can be a standard component of the development environment 448. The use of a standard logging component 490 can be advantageous over other methods of tracking and recording the execution of a data analysis. For example, rather than coding logging functionality into a report, a user can include, such as in a check method 464 (or, in some cases, a data source 456 or data evaluator 472), an appropriate method, application program interface, remote procedure call, remote function call or the like for the logging component 490. In at least some cases, using the logging component 490 can increase the reusability of the schema item, as functionality of the logging component 490 may be more flexible than hard coded feedback mechanisms.

The client system 436 may include a network interface 494 for communicating with other components of the architecture 400, including the database 408 and the framework 432. A user may input commands, and information may be displayed to the user through, a user interface 498. For example, the user, through the user interface 498, may enter commands to create, select, modify, or execute a data analysis schema. Information regarding the data analysis schema, including execution results, can also be presented to the user through the user interface 498.

The architecture 400 can include more or fewer components than shown, and may be organized in other manners. For example, functionality of a particular component can be carried out by another component. In addition, in at least some cases, functionality can be carried out using multiple components. In a specific example, the functionality of two or more of the database 408, the framework 432, and the client system 436 can be combined in a single system.

Example 4—Example Parallelization of Data Analysis Schema Execution

Figure 5:
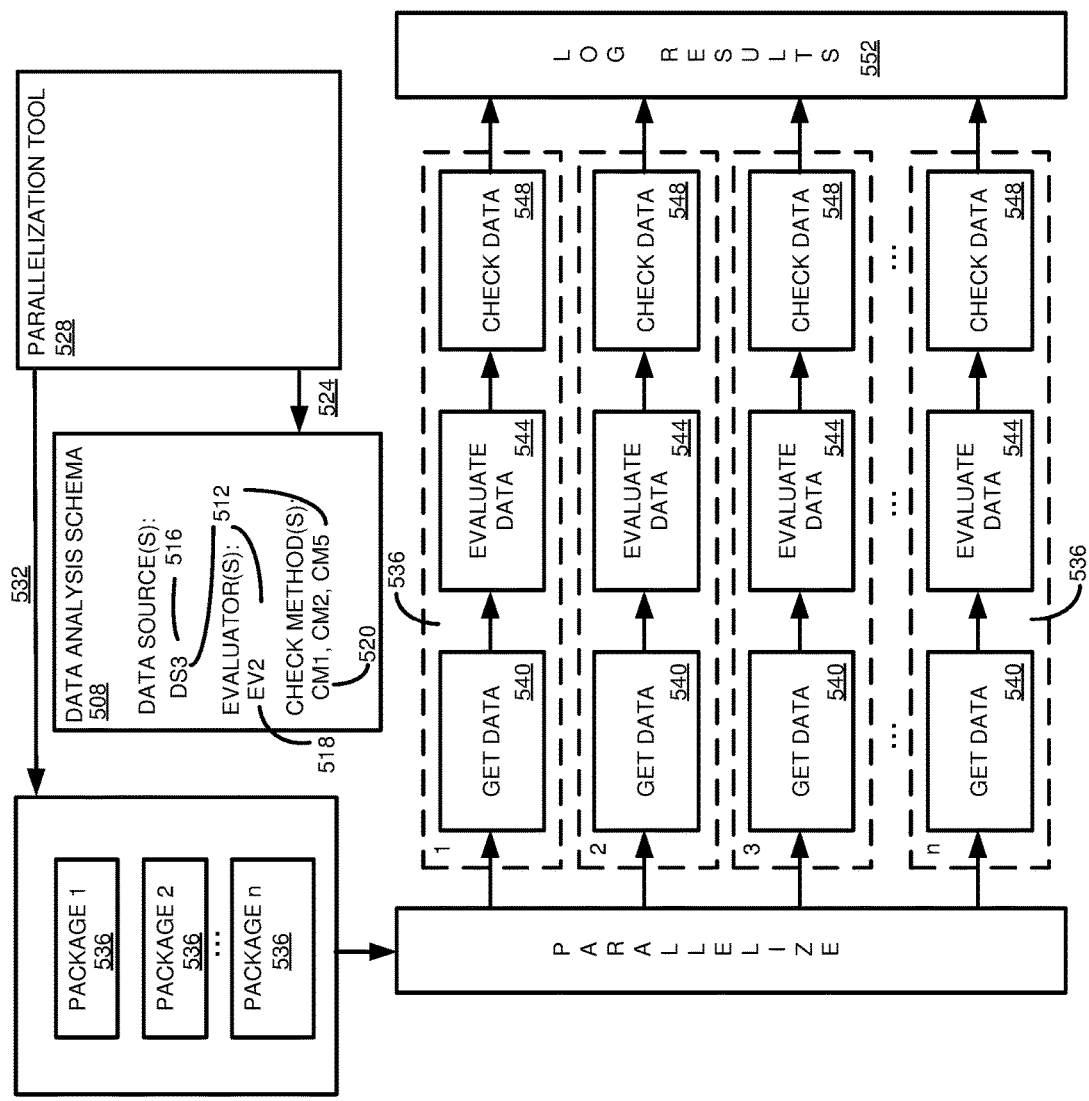
FIG. 5 is a diagram schematically illustrating how elements of a data analysis schema can be executed in parallel according to an embodiment of the present disclosure.

As discussed above, in at least some aspects, the present disclosure provides for executing at least certain operations of a data analysis schema in parallel, such as using the parallelization tool 486 of FIG. 4. A particular example of operation parallelization is depicted in FIG. 5.

A data analysis schema 508 includes schema components 512, including a data source 516, DS3, an evaluator 518, EV2, and three check methods 520, CM1, CM2, CM5. In process 524, a parallelization tool 528, such as the parallelization tool 486, calls the data analysis schema 508, such as using the check tool 476 of FIG. 4. The parallelization tool 528 can divide the operations into a plurality of packages 536 in process 532. The parallelization tool 528 can then call per package the schema component 512 to determine operations so that the analysis of each package due to the schema components 512 may be executed in parallel. Alternatively, or in addition, processing may be divided in another manner. For example, data may be retrieved using particular identifiers. The identifiers can be broken into groups, such as by a range of identifiers, and each group processed as a separate package 536. In at least some cases, a user may be able to specify a size for the packages 536.

The parallelization tool 528 can then execute two or more of the packages 536 in parallel. In parallel processes or threads for each of the packages 536 being executed in parallel, at 540, data associated with the data sources 516 can be retrieved, such as by analyzing a data source to determine what data should be retrieved (e.g., through SQL statements or specific data references), and where the data is stored (e.g., in the data store 412 of FIG. 4).

At 544, any data evaluators 518 can be applied to the data initially retrieved at 540. For example, data associated with a key date or other value can be filtered or adjusted for further processing. At 548, selected check methods 520 can be executed. In some cases, the check methods 520 can be specified for execution in a particular order. In other cases, the check methods 520 can be carried out in any order. According to a particular aspect, execution of the check methods 520 can be further parallelized for check methods that are independent of one another. For example, for a group of records retrieved at 540, and optionally subjected to one or more data evaluators 518, the group of records can be separately analyzed using one or more of CM1, CM2, and CM5 in parallel.

The results of applying the check methods 520 at 548 can be logged, in parallel, such as using the logger 490 of FIG. 4, at 552.

In at least some cases, the parallelization tool 528 can execute a data analysis schema in particular stages for a particular package, with stages between different packages being carried out concurrently (including different packages being carried out concurrently at different stages). For example, the parallelization tool 528 can have function modules for different processing activities, including a module to initiate the schema execution process (which can include using a schema to determine how packages should be constructed), a module to initialize execution components (e.g., one or more of check methods, data providers, a logger, data evaluators, data sources, and a check engine), a module to execute the schema components for the particular package, and a module to collect logging messages written during schema execution for the package.

Carrying out at least certain aspects of data analysis schema execution in parallel can provide advantages, particularly when combined with other aspects of the present disclosure. Execution of a data analysis schema may involve accessing and processing of substantial amounts of data. In some aspects of the present disclosure, data analyzed using a particular execution of a data analysis schema is limited to data added or changed since the schema was last executed. Thus, data reanalysis is avoided. In addition, as described above, data retrieved can be limited to data specified by the particular check methods being used. Retrieval of data that will not be used is thus avoided. Execution can be further facilitated by parallel processing of the reduced data set of changed or modified data specifically needed by the check methods of the data analysis schema. Thus, these features, alone or in combination, can improve the performance of a computing system that executes a data analysis schema.

Example 5—Example Data Analysis Schema Structure

Figure 6:
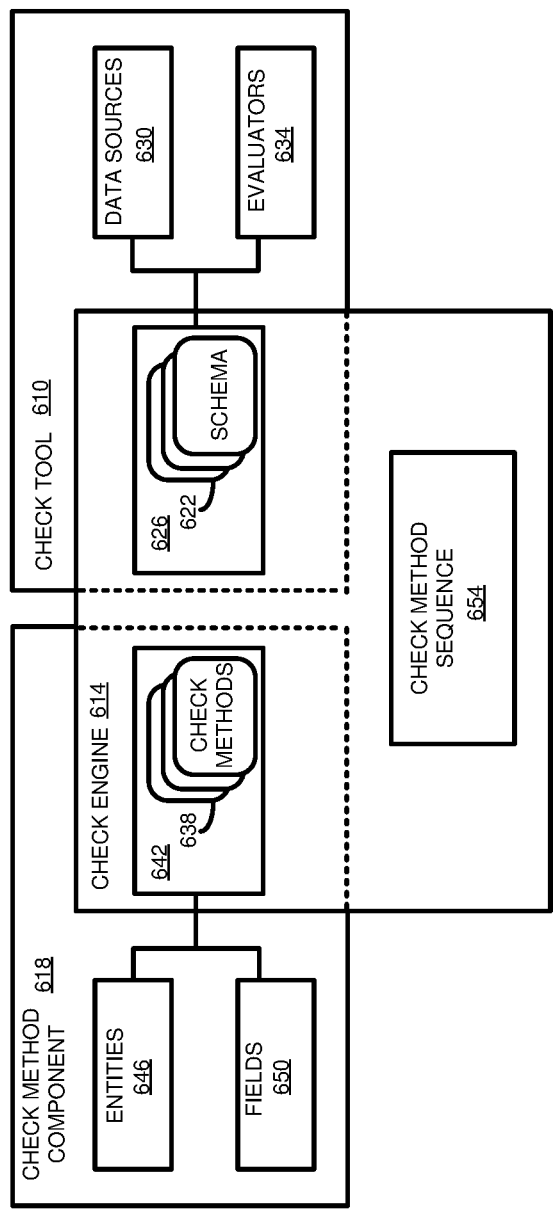
FIG. 6 is a diagram schematically depicting how check methods, a check engine, and a check tool can interact in executing a data analysis schema according to an embodiment of the present disclosure.

FIG. 6 illustrates the interrelation of a check tool 610, a check engine 614, and a check method component 618. As shown, the check engine 614 can serve as the interface between the check tool 610 and the check method component 618. The check tool 610 can access one or more data analysis schema 622 in a schema store 626. Each data analysis schema 622 is associated with one or more data sources 630 and, optionally, one or more data evaluators 634.

The check method component 618 can include one more check methods 638 stored in a check library 642. The check methods 638 can be associated with entities 646 whose data will be checked, and particular data fields 650 of those entities having data used in the checks. Limiting retrieved data to that used by the check methods 638 can allow for faster execution of the data analysis schema 622. The check engine 614 can access a check method sequence store 654, which can indicate a particular order or sequence in which the check methods 638 of a particular data analysis schema 622 are to be executed.

In some cases, information regarding a particular data analysis schema can be stored in a database table, as described in this Example 5. For example, a data analysis schema can be stored in table having the following format:

| VARIANT (Key) | DATA_SOURCE | DATA_VAL | DELTA_CHK | LAST_CHK_TS | DS_VARIANT |
| --- | --- | --- | --- | --- | --- |

VARIANT is an identifier for the particular data analysis schema and DATA_SOURCE specifies the identifier (such as a class name) for the data source(s) used in the data analysis schema. DATA_VAL can specify any data evaluators used in the data analysis schema. DELTA_CHK can be used as a flag to indicate whether the data analysis schema should analyze all relevant data, or only data added since a previous execution of the data analysis schema, which date can be maintained in LAST_CHK_TS. DS_VARIANT can specify further parameters to be used in retrieving data from a data source.

In a particular example, the information for DS_VARIANT can be stored in a table having the format:

| DS_VARIANT (Key) | FIELDNAME (Key) | SEQUENCE (Key) | VALUE | OPTION |
| --- | --- | --- | --- | --- |

Where DS_VARIANT is the identifier for the data source variant, as described above. FIELDNAME can refer to a particular field in the data source (and underlying data, such as data stored in the data store 412 of FIG. 4), which is to be analyzed. The field SEQUENCE can be used if FIELD-NAME can have different VALUEs. The SEQUENCE field can be used to distinguish between entries different in VALUE at the database level. VALUE can indicate a particular value for the field named in FIELDNAME. The OPTION field can specify how/whether the value of the fields should be selected, such as whether the value of the fields to be selected is greater than (">"), greater than or equal to (">="), less than ("<"), or less than or equal to ("<="), the particular VALUE named in the field for FIELD-NAME. In other cases, more complex relationships can be used to determine whether particular data values should be selected for analysis. In particular cases, data is selected if it satisfies the criteria specific in OPTION and VALUE. For instance, a VALUE of 1 having an OPTION of "not equal" would exclude any data having the value of 1 in FIELD-NAME. The table can include more, fewer, or different options than shown.

In creating a secondary data source from two or more primary data sources, the order of combining the primary data sources, including applying any selection rules specified by the DS_SEQUENCE table, can be specified, such as using a table having the format below:

| SDS | SEQUENCE | PDS |
|---|---|---|

Figure 7:
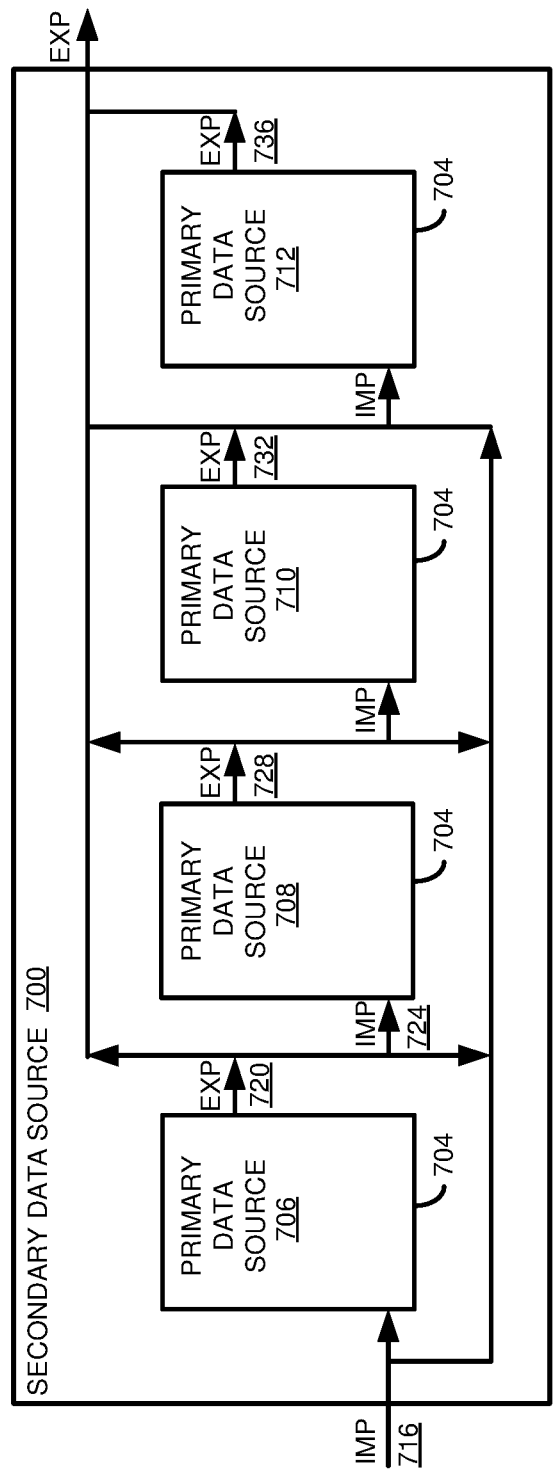
FIG. 7 is a diagram schematically illustrating how a secondary data source may be configured from a plurality of primary data sources according to an embodiment of the present disclosure.

SDS specifies an identifier for the particular secondary data source being constructed. SEQUENCE is a value specifying an order in which primary data sources specified by PDS should be added to (or evaluate in) the SDS being constructed. In particular cases, earlier-processed primary data sources can provide input for later-processed primary data sources, as illustrated in FIG. 7.

The output of one primary data source can be mapped to appropriate fields of another primary data source. In a particular example, the mapping can be accomplished using a table able the format below:

| SDS (Key) | SEQUENCE (Key) | PDS_TARGET (Key) | PDS_SOURCE (Key) | PDS_SRC_TAB (Key) |
|---|---|---|---|---| and having the additional columns:

| PDS_SRC_FLD (Key) | PDS_TRG_TAB | PDS_TRG_FLD | TRG_PREFIX | TRG_POSTFIX | TRG_OPTION |
|---|---|---|---|---|---|

SDS species an identifier for a particular secondary data source. SEQUENCE can specify an order in which the primary data source-primary data source mapping should be applied. PDS_TARGET can specify the destination primary data source into which fields from the source primary data source, PDS_SOURCE, should be mapped. PDS_S-RC_TAB and PDS_SRC_FLD can specify, respectively tables and fields of the source primary data source which will be mapped into the tables and fields of the destination, or target, primary data source, specified by PDS_TRG_TAB and PDS_TRG_FLD, respectively. TRG_PREFIX and TRG_POSTFIX can specify, respectively, formatting or relational information to be added before or after the data mapped to the destination field. For example, TRG_PREFIX may, in some cases, be "'" or ",('" while TRG_POSTFIX can be ",'", ",and '", ",or '", ",) and'", ",) or'", or ",)'". The OPTION field can specify whether the value of the field PDS_SRC_TAB-PDS_SRC_FLD is greater than, greater than or equal to, less than, or less than or equal to, not equal to ('< >'), or equal to ('=') the particular value of the field named in the field for PDS_TRG_TAB-PDS_TRG_FLD.

FIG. 7 illustrates a secondary data source 700 constructed from a plurality of primary data sources 704, including primary data sources 706, 708, 710, 712. Data, or information regarding data to be retrieved, can be imported to the secondary data source 700 in process 716. In some cases, for example, a secondary data source can serve as a data source to another secondary data source (that is, the secondary data source can act as a primary data source for another secondary data source). Or, data imported in 716 can serve as input parameters for the secondary data source 700.

The data imported in 716 is supplied to the primary data source 706, which can retrieve the appropriate data and supply it to one or both of the data exported from the secondary data source 700 in process 720 and the primary data source 708, 710, and 712 which is imported to the primary data sources 708, 710, and 712 in process 724. The primary data source 708 retrieves appropriate data, including using the data from primary data source 706 as input parameters, and provide the retrieved data to one or both of the export process 720 and to the primary data source 710 and 712 in export process 728. This process can be repeated for primary data sources 710 and 712. Every subsequent primary data source 708, 710, 712 in the chain of FIG. 7 may use the export data of the initial import data, as well as any export data of any preceding primary data source. In at least some implementations, the export process 720 can include data retrieved from each of the primary data sources 706, 708, 710, 712 in export processes 728, 732, 736. Although four primary data sources 704 are illustrated in FIG. 7, in other examples the secondary data source 700 can include more or fewer primary data sources 704, and may optionally include one or more secondary data sources (which can otherwise be treated equivalently to the primary data sources 704).

Check methods for a data analysis schema may be maintained in a database table, such as a table having the following format:

| CHKMETHOD (Key) | ENTITY | FG_KEYDATE | FG_ALLSETS | CHK_CLASS | CHK_METHOD |
|---|---|---|---|---|---|

CHKMETHOD can be an identifier for the particular check method. ENTITY can be the name of the entity, or object, which is checked. For example, an entity can be a defined type or collection of data. KEYDATE can be a flag indicating whether the check method should be valid for a single dataset. For instance, in some cases, only a single valid dataset should exist. FG_ALLSETS can be a flag indicating whether the check method should check all of the datasets at once, or whether it should execute checks on particular ENTITYs to be checked in discrete operations (that is, executing the checks individually, or executing all of them in a loop as a single operation). CHECK_CLASS and CHECK_METHOD can specify, respectively, the name of the class and method which implement and execute the check method specified by CHKMETHOD.

As previously discussed, in at least some cases, multiple check methods may be executed as part of a data analysis schema. The present disclosure can provide for ordering the methods, such as using an order stored in a table having the format:

| VARIANT (Key) | SEQUENCE (Key) | CHKMETHOD |
|---|---|---|

VARIANT can refer to the particular data analysis schema, defined in the table above. CHKMETHOD can identify a particular check method, as defined in the table above. SEQUENCE can represent the particular order a specified check method (CHKMETHOD) should be executed in the data analysis schema (VARIANT). In a particular example, SEQUENCE can be an integer value, with the execution order being executed sequentially by increasing SEQUENCE value.

Example 6—Example Data Analysis System Using Data Analysis Schema

Figure 8:
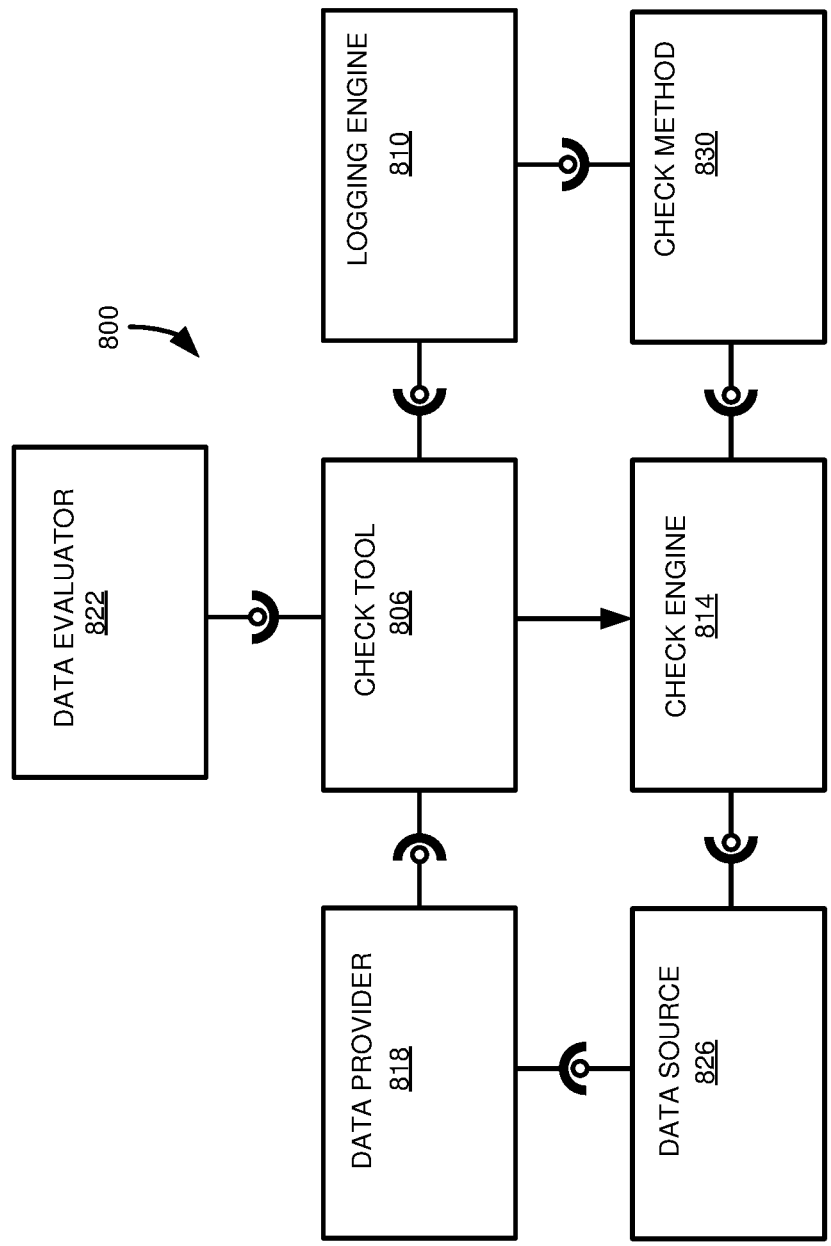
FIG. 8 is a diagram schematically illustrating the interaction of data analysis schema execution components during executing of the data analysis schema according to an embodiment of the present disclosure.

FIG. 8 illustrates how components of the architecture 400 of FIG. 4 can provide a system 800 where the components can interact in executing a data analysis schema. Initially, when a data analysis schema is selected for execution, a check tool 806 can create instances of data types or objects. For example, the check tool 806 can determine from the data analysis schema which data source, check methods, and, optionally, evaluator, are needed, and create appropriate instances of a logging engine 810, a check engine 814, the data provider 818, and, optionally, a data evaluator 822. The logging engine 810, data providers 818, and data evaluators 822 can provide appropriate interfaces for allowing access by the check tool 806.

The data provider 818 retrieves information (retrieval parameters) regarding a data source associated with the data analysis schema, such as information regarding DS_VARIANT, the DS_SEQUENCE table, and the SDS discussed in Example 5. The data provider 818 may be able to obtain information useable to customize data to be retrieved from these sources (such as data sources specified in a data source library, such as the data source store 452 of FIG. 4), or provided, by accessing a table or other repository where the information is stored. The data provider 818 calls the data source 826 according to the data source identifier assigned to the data analysis schema with the retrieval parameters.

In particular examples, the data source 826 communicates with the check engine 814 (or, in other cases, the check tool 806, for example, in parameters passed to the data provider when it is called by the check tool) to determine what information is needed. In turn, the check engine 814 can communicate with the check methods 830 to determine what information is needed for the check methods. In other cases, the system may operate differently. For example, the data provider 818 may be able to communicate directly with the check methods 830. Or, the data provider 818 may be able to obtain information useable to customize data to be retrieved, or provided, by accessing a table or other repository where the information is stored.

Once the data provider 818 has determined the retrieval parameters (including any customization), the data can be requested from the data sources 826. For example, the data sources 826 can provide an interface for the data providers 818. The data sources 826 can also be in communication with the check engine 814 (or the check methods 830) to determine what information is needed by the check methods of the data analysis schema, such as using an appropriate interface provided by the check engine. Checking the needed information can limit data retrieval to that needed to carry out the check methods 830. In some cases, the data can be read from a buffer or cache. In other cases, the data can be read directly from a data store, such as the data store 412 of the database 408 of FIG. 4 or another data store. In some cases, the data sources 826 can retrieve at least a portion of the data using query operations, such as SQL statements.

Data obtained by the data provider 818 can optionally be evaluated by any data evaluators 822 associated with the data analysis schema. For example, the data evaluator 822 may provide an interface that can be accessed by the check tool 806. In some implementations, the data evaluator 822 may restrict data to be tested to one or more particular key date values. For example, if a report relates to components used in assembling an automobile, the parts used in constructing the automobile may be different at different times. A key date can be used to select data under a particular set of circumstances (e.g., that obtained on the key date, when the key date was valid, etc.). In some cases, any data evaluators 822 can apply to all check methods in the data analysis schema. In other cases, data evaluators 822, if any, can be determined individually for the check methods 830 in the data analysis schema.

After any data evaluators 822 have been applied, the data can be checked by the check methods 830, such as by calling the appropriate check methods using the check engine 814. For example, the check methods 830 can provide an interface that can be accessed by the check engine 814. If any errors, such as failed checks or data to which the checks cannot be applied, or other conditions which would generate logging activity, are encountered, the corresponding messages can be added to a log using the logging engine 810. The logging engine 810 can provide an interface for providing access to the check methods 830.

Although FIG. 8 illustrates certain components in communication, in further embodiments, the system 800 can be configured differently. For example, the components may communicate with more, fewer, or different components than shown. In particular aspects, the logging engine 810 can be in communication with additional components of the system 800, such as the data evaluator 822, the data provider 818, the data source 826, and the check engine 814.

Example 7—Example Data Analysis Execution

Figure 9:
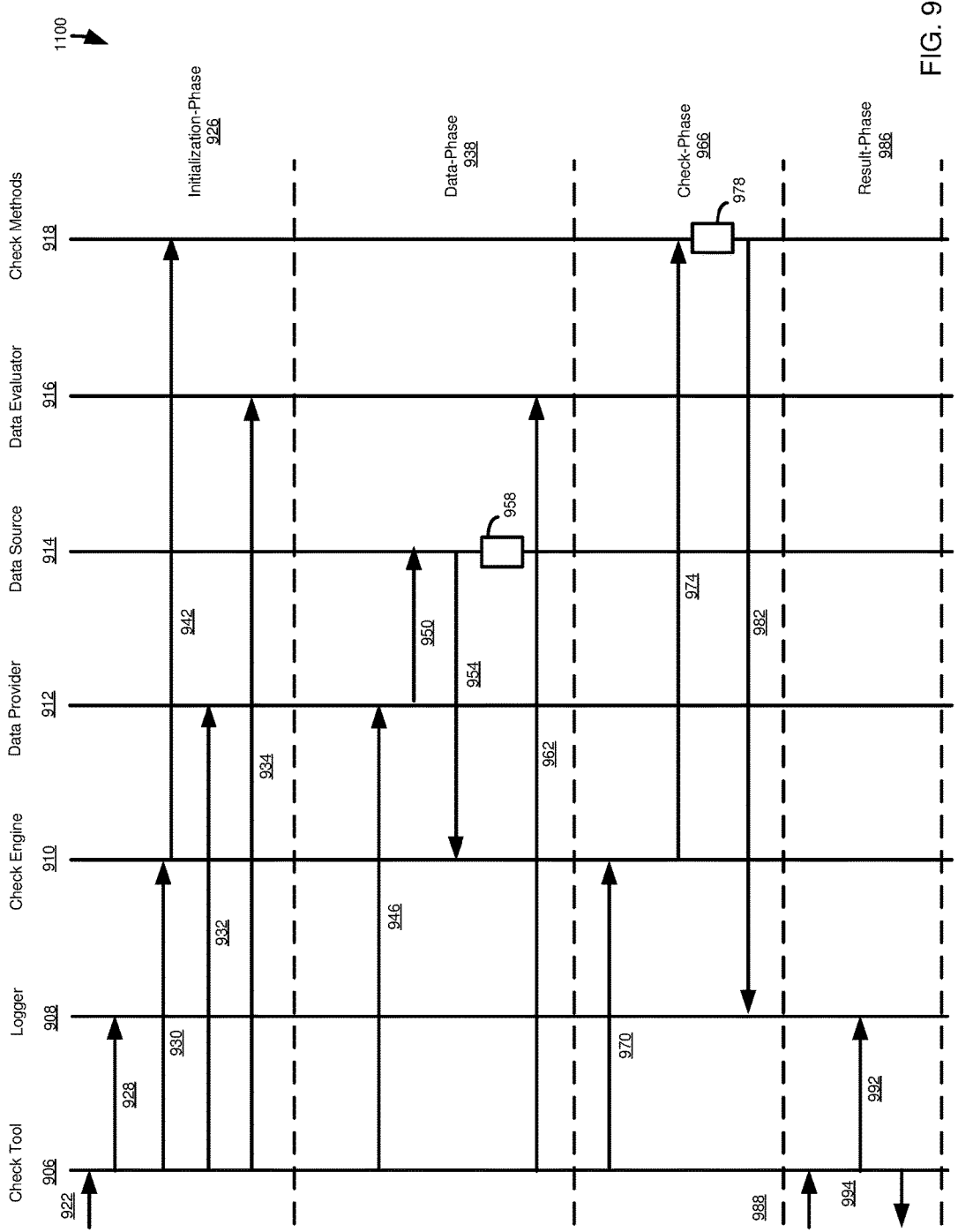
FIG. 9 is a diagram illustrating operations occurring at data analysis schema execution components during executing of the data analysis schema according to an embodiment of the present disclosure.

FIG. 9 illustrates a timing diagram of the flow of information among components of the architecture 400 of FIG. 4 in executing a data analysis schema. In particular examples, the information flow of FIG. 9 can be carried out using the system 800 of FIG. 8.

FIG. 9 illustrates timelines for a check tool 906, a logger 908, a check engine 910, a data provider 912, a data source 914, a data evaluator 916, and a check method 918. After being called to execute a data analysis schema at 922, in an initialization phase 926, the check tool 906 creates an instance of the logger 908 at 928, an instance of the check engine 910 at 930, an instance of the data provider 912 at 932, and, optionally, an instance of the data evaluator 916 at 934. During the creation of the instance of the check engine at 930, the check engine 910 calls the check methods 918 at 942 to determine what data is needed for the check methods. The description of the needed data is buffered in the check engine 910.

The check tool 906 calls the data provider 912 at 946, including supplying information regarding data needed by the check methods 918. In turn, the data provider 912 calls the data source 914 at 950. At 954, the data source 914 requests information from the check engine 910 regarding what data is required for the check methods 918. The check engine 910 returns the buffered description of the needed data. The data source 914 obtains the requested data at 958 using the description of the needed data, limiting the retrieved data to that needed by the method methods 918. At 962, the check tool 906 calls any data evaluators 916 associated with the data analysis schema, producing a set of data to be checked in a check-phase 966.

At 970, the check tool 906 directs the check engine 910 to execute the check methods 918. In turn, the check engine 910 calls the check methods 918 at 974. The checks are carried out at 978. Any logging information generated during the checks at 974 is provided to the logger 908 at 982.

In a results-phase 986, the check tool 906 receives a request to view logging activity at 988. At 992, the check tool 906 retrieves the message from the logger 908. The messages are returned, such as to a user, at 994.

Example 8—Example Data Analysis Using Data Analysis Schema

Figure 10:
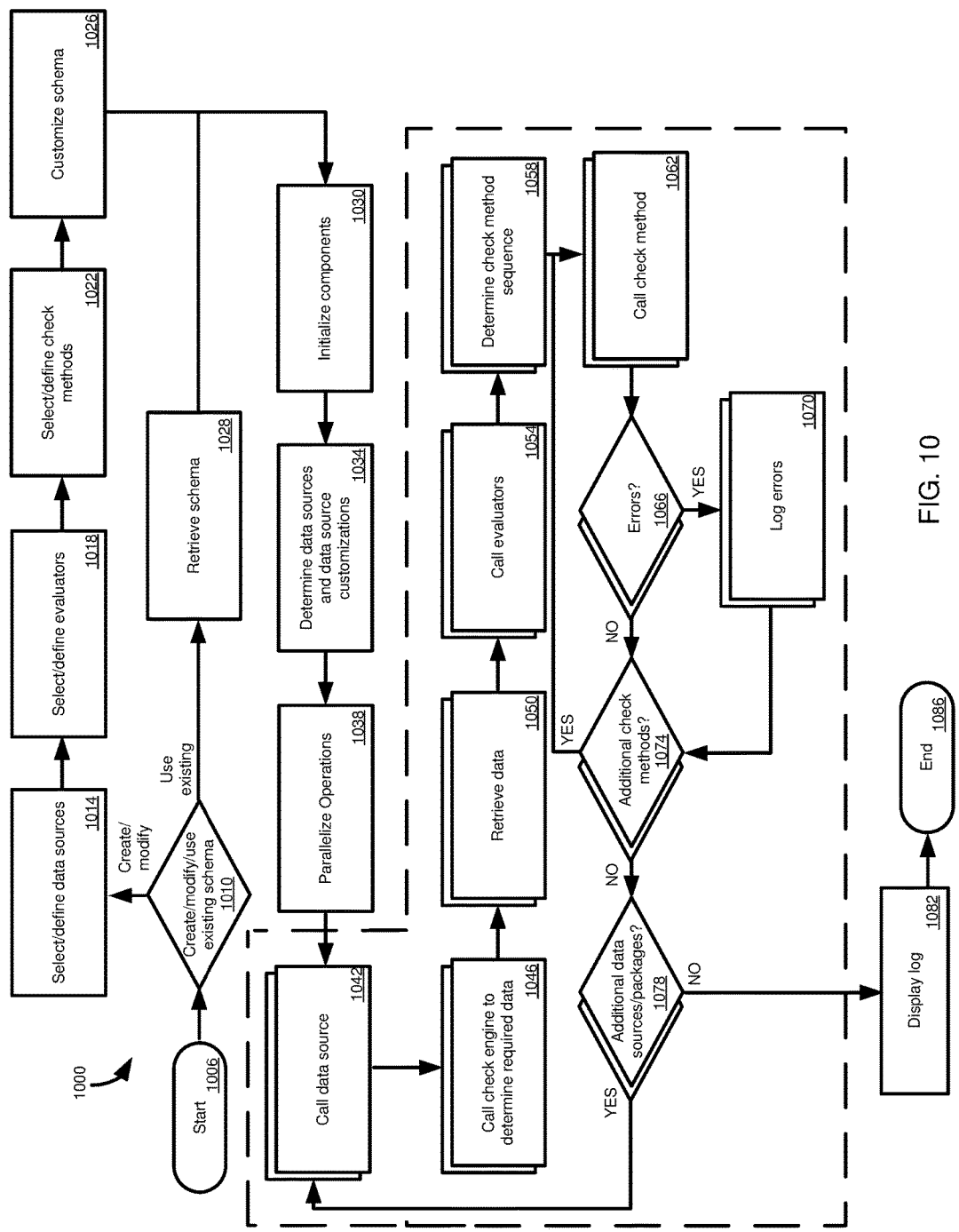
FIG. 10 is a flowchart of a method of executing a data analysis schema according to an embodiment of the present disclosure.

FIG. 10 is a flowchart of an example method 1000 for carrying out a data analysis using a data analysis schema. The method 1000 can be carried out, in some examples, using components of the architecture 400 of FIG. 4. In some cases, the method 1000 can be manually selected for execution. In other cases, the method 1000 can be triggered by an event, or can be carried out according to a schedule.

The method begins at 1006. At decision 1010, the method 1000 determines whether an existing data analysis schema is to be executed, or if a data analysis schema is to be created or modified. If a data analysis schema is to be created or modified (after retrieving the data analysis schema, such as from the schema store 476), data sources used in the data analysis schema can be created, modified, or selected at 1014. At 1018, any evaluators to be used in the data analysis schema can be created, modified, or selected. Check methods to be used in the data analysis schema can be created, modified, or selected at 1022.

If desired, the data analysis schema can be further customized at 1026. For example, secondary data sources can be defined, or the data sources can be customized. Customization can also include determining the order in which multiple check methods will be applied. In particular examples, the creation, modification, and selection steps 1014, 1018, 1022, and the customization step 1026, can be carried out using the user interface 498 of the client system 436, the user interface 440 of the framework 432, and optionally, check methods 464 stored in the check method store 460, data evaluators 472 stored in the data evaluator store 468, and data sources 456 stored in the data sources store 452 of the development environment 448. The method 1000 then proceeds to 1030.

If, in decision 1010, it was determined that an existing data analysis schema is to be used, the schema can be retrieved, such as from the schema store 476, at 1028. The method 1000 then proceeds to 1030.

At 1030, components for processing the data analysis schema are initialized. For example, instances can be created of one or more of a data provider, a data evaluator, a check engine, and a logger, such as by the check tool 476. The data sources used in the data analysis schema, and any customization information thereof, is determined at 1034. At 1038, optionally, all or a portion of the operations associated with processing the data analysis schema can be parallelized. For example, the operations can be divided into packages that can be executed in parallel, such as using the parallelization tool 486.

At 1042, the data sources of the data analysis schema can be called, such as by the data provider instances. The data sources can communicate with the check engine 482 at 1046 to determine what information is needed for the check methods of the data analysis schema. The corresponding data can be retrieved at 1050.

At 1054, any data evaluators used in the data analysis schema can be called, and the data retrieved at 1050 evaluated. The check method sequence of the data analysis schema is analyzed at 1058. At 1062, the first check method in the sequence is called and applied to the data selected by the evaluators at 1054, or the data retrieved at 1050 when evaluators are not used.

Decision 1066 determines whether any errors, or other activity that would generate logging activity, was encountered in applying the check method at 1062. If errors were encountered, they are written in a log at 1070. After writing the errors to a log at 1070, or after decision 1066 if no errors were encountered, the method 1000 determines at 1074 whether any additional check methods are to be applied to the data source being analyzed. If additional check methods are to be applied, the method 1000 can return to 1058 to determine the next check method in the sequence.

If no additional check methods are to be applied, decision 1078 determines whether any additional packages or data sources are to be analyzed (for example, when operations associated with executing the data analysis procedure are not carried out in parallel, or the number of packages is larger than can be executed concurrently). If additional packages or data sources are to be analyzed, the method 1000 returns to 1042 to call the next package or data source. If it is determined at 1078 that no additional packages or data sources are to be analyzed, the method 1000 proceeds to 1082.

At 1082, any messages logged at 1070 can be sent, displayed, stored, or otherwise output. The process 1000 ends at 1086.

Example 9—Computing Systems

Figure 11:
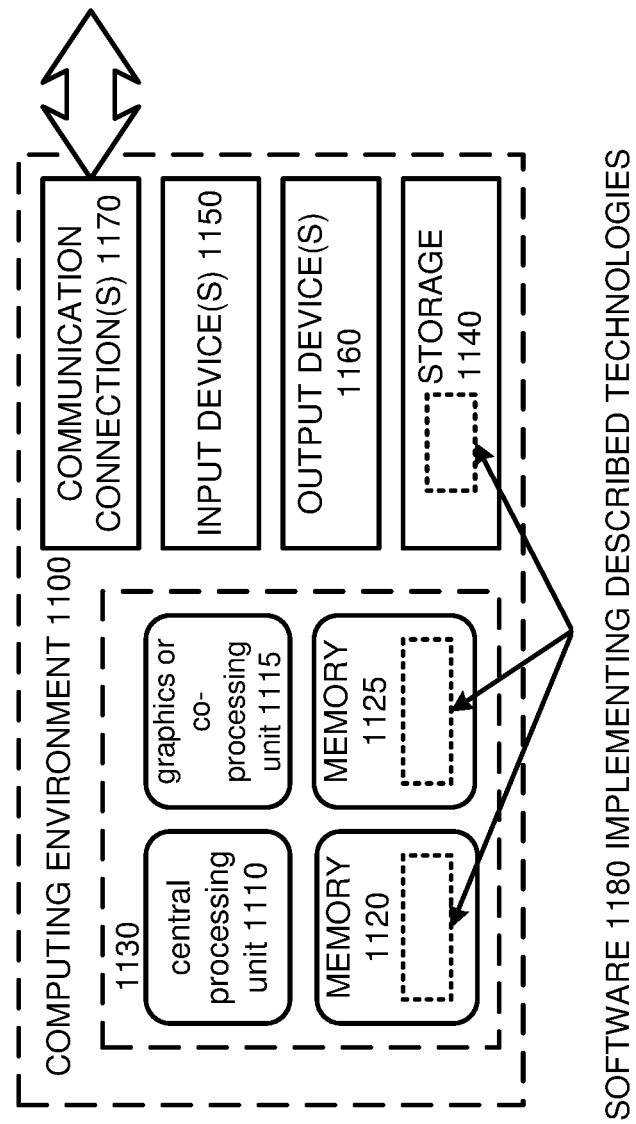
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing execution components of a data analysis schema, associated methods of executing the data analysis schema, described herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store database data, such as data associated with the database 408 of FIG. 4.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 12:
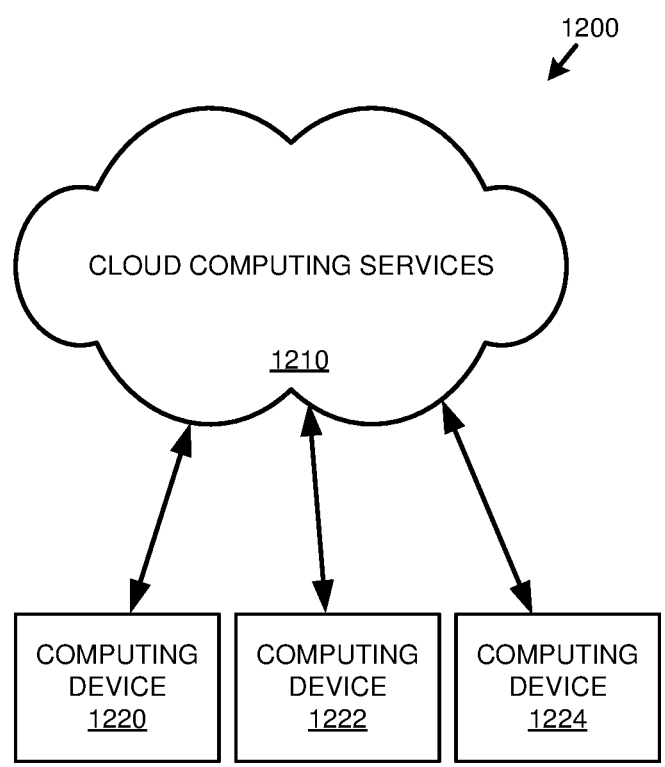
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing:
    computer-executable instructions providing a data source repository comprising a plurality of reusable data source definitions, a given data source definition of the data source repository specifying a data source;
    computer-executable instructions providing a check method repository comprising a plurality of reusable check method definitions, wherein:
        (A) a given check method definition of the check method repository stores information comprising:
            (i) one or more rules for analyzing data; and
            (ii) a definition of data to be retrieved from a data source specified by a data source definition of the data source repository; and
        (B) at least a first check method definition of the check method repository comprising a first definition of data specifying a first portion of data from a first data source specified by a first data source definition of the data source repository and at least a second check method definition of the check method repository comprising a second definition of data specifying a second portion of data from the first data source, the first portion of data being at least partially different than the second portion of data;
    computer-executable instructions providing a data analysis schema repository comprising a plurality of data analysis schema, wherein a given data analysis schema of the plurality of data analysis schema comprises (i) an identifier of at least one data source definition of the data source repository; and (ii) an identifier of at least one check method definition of the check method repository, wherein different data analysis schema may specify a same check method definition or a same data source definition;
    computer-executable instructions receiving a request to analyze data, the request specifying a data analysis schema identifier for a data analysis schema stored in the data analysis schema repository;
    computer-executable instructions retrieving a first data analysis schema stored in the data analysis schema repository having the data analysis schema identifier;
    computer-executable instructions, from the first data analysis schema, determining that the first data analysis schema comprises an identifier of the first data source definition, an identifier of the first check method definition, and an identifier of the second check method definition;
    computer-executable instructions retrieving the first check method definition from the check method repository;
    computer-executable instructions buffering the first definition of data, the first definition of data being data to which the one or more rules of the first check method definition will apply;
    computer-executable instructions retrieving the second check method definition from the check method repository;
    computer-executable instructions buffering the second definition of data, the second definition of data being data to which the one or more rules of the second check method definition will apply;
    computer-executable instructions retrieving the first data source definition;
    computer-executable instructions calling the first data source;

from the first data source, computer-executable instructions retrieving the first portion of data and the second portion of data as indicated by the buffered first and second definitions of data;

computer-executable instructions, independently and in parallel (i), with the one or more rules of the first check method definition, analyzing the first portion of data according to the one or more rules of the first check method definition to provide first check results; and (ii) with the one or more rules of the second check method definition, analyzing the second portion of data according to the one or more rules of the second check method definition to provide second check results; and computer-executable instructions outputting the first and second check results.

2. The one or more non-transitory computer-readable storage media of claim 1, wherein the first definition of data comprises one or more data fields.

3. The one or more non-transitory computer-readable storage media of claim 1, wherein the first definition of data comprises one or more entities.

4. The one or more non-transitory computer-readable storage media of claim 1, further comprising:

computer-executable instructions retrieving customization information for the first data source from the first data analysis schema, the customization information comprising at least one data identifier;

wherein retrieving the first portion of data comprises retrieving data associated with the at least one data identifier.

5. The one or more non-transitory computer-readable storage media of claim 1, further comprising:

computer-executable instructions, from the first data analysis schema, determining a data evaluator to be applied to retrieved first portion of data;

computer-executable instructions calling the data evaluator; and computer-executable instructions applying the data evaluator to the retrieved first portion of data.

6. The one or more non-transitory computer-readable storage media of claim 5, wherein the data evaluator is stored in a library comprising a plurality of data evaluators.

7. The one or more non-transitory computer-readable storage media of claim 1, further comprising:

computer-executable instructions determining that a datum does not satisfy a check method;

computer-executable instructions preparing an error message; and computer-executable instructions writing the error message to a log.

8. The one or more non-transitory computer-readable storage media of claim 7, wherein writing the error message to a log comprising calling a method of a logger.

9. The one or more non-transitory computer-readable storage media of claim 1, further comprising:

computer-executable instructions determining that a datum does not satisfy a check method;

computer-executable instructions generating an alert indicating the check method has not been satisfied; and computer-executable instructions transmitting the alert.

10. The one or more non-transitory computer-readable storage media of claim 1, further comprising:

computer-executable instructions determining a check method execution sequence in the first data analysis schema between at least one of the first check method definition or the second check method definition, and at least a third check method definition associated with corresponding identifier included in the first data analysis schema.

11. A computing system that implements a data analysis schema processing system, the computing system comprising:

memory;

one or more processing units coupled to the memory; and one or more non-transitory computer readable storage media storing instructions that, when loaded into the memory, cause the one or more processing units to perform operations for:

providing a data source repository comprising a plurality of reusable data source definitions, a given data source definition of the data source repository specifying a data source;

providing a check method repository comprising a plurality of reusable check method definitions, wherein:

(A) a given check method definition of the check method repository stores information comprising:
  (i) one or more rules for analyzing data; and
  (ii) a definition of data to be retrieved from a data source specified by a data source definition of the data source repository; and (B) at least a first check method definition of the check method repository comprising a first definition of data specifying a first portion of data from a first data source specified by a first data source definition of the data source repository and at least a second check method definition of the check method repository comprising a second definition of data specifying a second portion of data from the first data source, the first portion of data being at least partially different than the second portion of data;

providing a data analysis schema repository comprising a plurality of data analysis schema, wherein a given data analysis schema of the plurality of data analysis schema comprises (i) an identifier of at least one data source definition of the data source repository; and (ii) an identifier of at least one check method definition of the check method repository, wherein different data analysis schema may specify a same check method definition or a same data source definition;

receiving user input selecting an identifier of the first data source definition from the data source repository a library of data sources to be included in a first data analysis schema;

storing the identifier of the first data source definition in the first data analysis schema;

displaying to a user a plurality of check method identifiers from the check method repository;

receiving user input selecting identifiers of the first and second check methods definitions to be included in the first data analysis schema;

storing the identifiers of the first and second check methods in the first data analysis schema;

storing the first data analysis schema;

receiving a request to analyze data, the request specifying a data analysis schema identifier for a data analysis schema stored in the data analysis schema repository;

retrieving the first data analysis schema, stored in the data analysis schema repository, having the data analysis schema identifier;

from the first data analysis schema, determining that the first data analysis schema comprises an identifier of the first data source definition, an identifier of the first check method definition, and an identifier of the second check method definition;

retrieving the first check method definition from the check method repository;

buffering the first definition of data, the first definition of data being data to which the one or more rules of the first check method definition will apply;

retrieving the second check method definition from the check method repository;

buffering the second definition of data, the second definition of data being data to which the one or more rules of the second check method definition will apply;

retrieving the first data source definition;

calling the first data source;

from the first data source, retrieving the first portion of data and the second portion of data as indicated by the buffered first and second definitions of data;

independently and in parallel (i), with the one or more rules of the first check method definition, analyzing the first portion of data according to the one or more rules of the first check method definition to provide first check results; and (ii) with the one or more rules of the second check method definition, analyzing the second portion of data according to the one or more rules of the second check method definition to provide second check results; and outputting the first and second check results.

12. The computing system of claim 11, the operations further comprising:

receiving user input selecting an identifier of at least one data evaluator from a library of data evaluators to be included in the first data analysis schema; and storing the at least one selected data evaluator identifier in the first data analysis schema.

13. The computing system of claim 11, further comprising receiving user input specifying an execution order for the first or second check method definitions with respect to at least a third check method definition specified in the first data analysis schema.

14. The computing system of claim 11, wherein the operations further comprise:

determining a check method execution sequence in the first data analysis schema between at least one of the first check method definition or the second check method definition and at least a third check method definition associated with corresponding identifier included in the first data analysis schema; and executing the first, second, and at least a third check method definitions in the determined check method execution sequence.

15. In a computing system comprising a memory and one or more processors, a method of executing a data analysis schema, the method comprising:

providing a data source repository comprising a plurality of reusable data source definitions, a given data source definition of the data source repository specifying a data source;

providing a check method repository comprising a plurality of reusable check method definitions, wherein:

(A) a given check method definition of the check method repository stores information comprising:

(i) one or more rules for analyzing data; and (ii) a definition of data to be retrieved from a data source specified by a data source definition of the data source repository; and (B) at least a first check method definition of the check method repository comprising a first definition of data specifying a first portion of data from a first data source specified by a first data source definition of the data source repository and at least a second check method definition of the check method repository comprising a second definition of data specifying a second portion of data from the first data source, the first portion of data being at least partially different than the second portion of data;

providing a data analysis schema repository comprising a plurality of data analysis schema, wherein a given data analysis schema of the plurality of data analysis schema comprises (i) an identifier of at least one data source definition of the data source repository; and (ii) an identifier of at least one check method definition of the check method repository, wherein different data analysis schema may specify a same check method definition or a same data source definition;

receiving a request to analyze data, the request specifying a data analysis schema identifier for a data analysis schema stored in the data analysis schema repository;

retrieving a first data analysis schema stored in the data analysis schema repository having the data analysis schema identifier;

from the first data analysis schema, determining that the first data analysis schema comprises an identifier of the first data source definition, an identifier of the first check method definition, and an identifier of the second check method definition;

retrieving the first check method definition from the check method repository;

buffering the first definition of data, the first definition of data being data to which the one or more rules of the first check method definition will apply;

retrieving the second check method definition from the check method repository;

buffering the second definition of data, the second definition of data being data to which the one or more rules of the second check method definition will apply;

retrieving the first data source definition;

calling the first data source;

from the first data source, retrieving the first portion of data and the second portion of data as indicated by the buffered first and second definitions of data;

independently and in parallel (i), with the one or more rules of the first check method definition, analyzing the first portion of data according to the one or more rules of the first check method definition to provide first check results; and (ii) with the one or more rules of the second check method definition, analyzing the second portion of data according to the one or more rules of the second check method definition to provide second check results; and outputting the first and second check results.

16. The method of claim 15, further comprising:

from the first data analysis schema, determining a data evaluator to be applied to the retrieved first portion of data;

calling the data evaluator; and applying the data evaluator to the retrieved first portion of data.

17. The method of claim 16, wherein the data evaluator is stored in a repository comprising a plurality of data evaluators.

18. The method of claim 15, further comprising:
determining a check method execution sequence in the first data analysis schema between at least one of the first check method definition or the second check method definition and at least a third check method definition associated with a corresponding identifier included in the first data analysis schema.

19. The method of claim 18, further comprising executing the first, second, and at least a third check method definitions in the determined check method execution sequence.

20. The method of claim 15, further comprising:
receiving user input defining the first data analysis schema; and
storing the first data analysis schema in the data analysis schema repository.

\* \* \* \* \*